US011109326B2

(12) United States Patent
Loehr et al.

(10) Patent No.: US 11,109,326 B2
(45) Date of Patent: Aug. 31, 2021

(54) REPORTING POWER HEADROOM INFORMATION

(71) Applicant: Lenovo (Singapore) Pte. Ltd., New Tech Park (SG)

(72) Inventors: Joachim Loehr, Wiesbaden (DE); Alexander Johann Maria Golitschek Edler von Elbwart, Darmstadt (DE); Hossein Bagheri, Urbana, IL (US); Prateek Basu Mallick, Dreieich (DE); Ravi Kuchibhotla, Clarendon Hills, IL (US); Vijay Nangia, Woodridge, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 63 days.

(21) Appl. No.: 16/271,685

(22) Filed: Feb. 8, 2019

(65) Prior Publication Data

US 2019/0261288 A1  Aug. 22, 2019

Related U.S. Application Data

(60) Provisional application No. 62/628,241, filed on Feb. 8, 2018.

(51) Int. Cl.
*H04W 52/36* (2009.01)
*H04W 24/08* (2009.01)
*H04W 72/04* (2009.01)
*H04W 52/34* (2009.01)
*H04W 52/14* (2009.01)

(52) U.S. Cl.
CPC ........ *H04W 52/365* (2013.01); *H04W 24/08* (2013.01); *H04W 52/34* (2013.01);
(Continued)

(58) Field of Classification Search
CPC ... H04W 52/365; H04W 52/34; H04W 24/08; H04W 72/0446; H04W 72/0453; H04W 52/146
See application file for complete search history.

(56) References Cited

U.S. PATENT DOCUMENTS

2018/0279339 A1* 9/2018 Lohr .................. H04W 72/1268
2019/0098622 A1* 3/2019 Lee .................... H04W 72/0446

FOREIGN PATENT DOCUMENTS

| WO | 2016137816 A2 | 9/2016 |
| WO | 2017071557 A1 | 5/2017 |
| WO | 2017173177 A1 | 10/2017 |

OTHER PUBLICATIONS

3GPP "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.4.0 , Sep. 2017, pp. 1-329.
(Continued)

*Primary Examiner* — Yaotang Wang
(74) *Attorney, Agent, or Firm* — Kunzler Bean & Adamson

(57) ABSTRACT

Apparatuses, methods, and systems are disclosed for reporting power headroom ("PH") information. One apparatus includes a transceiver that communicates with a base unit using a first uplink carrier and a second uplink carrier concurrently, first uplink carrier having a longer transmission duration unit ("TDU") length than the second uplink carrier. The apparatus also includes a processor that receives an uplink resource allocation for a first TDU on the first uplink carrier, the first TDU overlapping in time with at least two second TDUs on the second uplink carrier. The processor determines a third TDU on the second uplink carrier, the third TDU comprises at least one of the second TDUs. The
(Continued)

processor calculates PH information for the second uplink carrier associated with the third TDU and reports, via the transceiver, the PH information in an uplink transmission on the first TDU.

26 Claims, 8 Drawing Sheets

(52) U.S. Cl.
CPC ... *H04W 72/0446* (2013.01); *H04W 72/0453* (2013.01); *H04W 52/146* (2013.01)

(56) References Cited

OTHER PUBLICATIONS

ETSI, "LTE; Evolved Universal Terrestrial Radio Access (E-UTRA); Medium Access Control (MAC) protocol specification (3GPP TS 3.321 version 12.5.0 Release 12", ETSI TS 136 321 V 12.5.0, Apr. 2015, pp. 1-79.

ETSI, 5G; Study on Scenarios and Requirements for Next Generation Access Technologies (3GPP TR 38.913 version 14,2,0 Release 14), ETSI TR 128 913 V14.2.0, May 2017, pp. 1-41.

ETSI, LTE; Evolved Universal Terrestrial Radio Access (E-UTRA); Physical layer procedures (3GPP TS 36.213 version 142.0 Release 14), ETSI TS 136 213 V14.2.0, Apr. 2017, pp. 1-456.

ETSI, LTE; Evolved Universal Terrestrial Radio Access (E-UTRA); User Equipment (UE) radio transmission and reception (#GPP TS 36.101 version 14.5.0 Release 14), Nov. 2017, pp. 1-1512.

PCT International Searching Authority, "Notification of Transmittal of the International Search Report and the Written Opinion of the International Searching Authority, or the Declaration", PCT/IB2019/000128, dated May 17, 2019, pp. 1-16.

\* cited by examiner

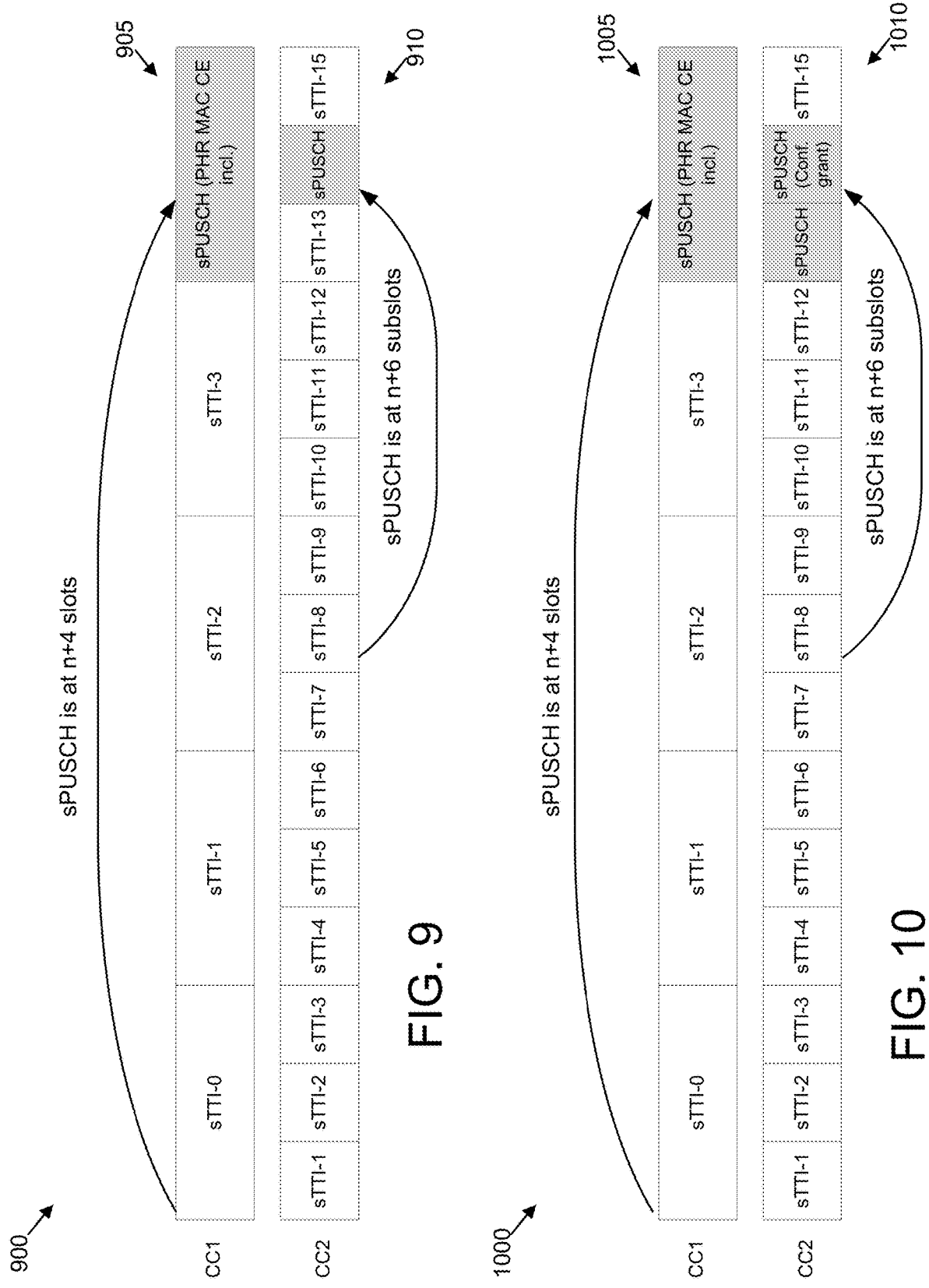

REPORTING POWER HEADROOM INFORMATION

CROSS-REFERENCE TO RELATED APPLICATIONS

This application claims priority to U.S. Provisional Patent Application No. 62/628,241 entitled "PHR PROCEDURE WHEN AGGREGATING CARRIERS CONFIGURED WITH DIFFERENT TTI LENGTHS" and filed on Feb. 8, 2018 for Joachim Loehr, Alexander Johann Maria Golitschek Edler von Elbwart, Hossein Bagheri, Prateek Basu Mallick, Ravi Kuchibhotla, and Vijay Nangia, which is incorporated herein by reference.

FIELD

The subject matter disclosed herein relates generally to wireless communications and more particularly relates to reporting power headroom information.

BACKGROUND

The following abbreviations are herewith defined, at least some of which are referred to within the following description: Third Generation Partnership Project ("3GPP"), Fifth-Generation Core ("5GC"), Access and Mobility Management Function ("AMF"), Access Point Name ("APN"), Access Stratum ("AS"), Adjacent Channel Leakage Ratio ("ACLR"), Bandwidth Adaptation ("BA"), Bandwidth Part ("BWP"), Beam Failure Detection ("BFD"), Beam Failure Recovery Request ("BFRR"), Binary Phase Shift Keying ("BPSK"), Buffer Status Report ("BSR"), Block Error Rate ("BLER"), Carrier Aggregation ("CA"), Cell-Specific Radio Network Temporary Identifier ("C-RNTI"), Clear Channel Assessment ("CCA"), Cyclic Prefix ("CP"), Common Search Space ("C-SS"), Control Element ("CE"), Cyclical Redundancy Check ("CRC"), Channel State Information ("CSI"), Common Search Space ("CSS"), Data Radio Bearer ("DRB," e.g., carrying user plane data), Demodulation Reference Signal ("DM-RS"), Discontinuous Reception ("DRX"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), Evolved Packet Core ("EPC"), Evolved UMTS Terrestrial Radio Access Network ("E-UTRAN"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), General Packet Radio Service ("GPRS"), Global System for Mobile Communications ("GSM"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Logical Channel ("LCH"), Long Term Evolution ("LTE"), Master Information Block ("MIB"), Multiple Access ("MA"), Medium Access Control ("MAC"), Master Cell Group ("MCG"), Modulation Coding Scheme ("MCS"), Machine Type Communication ("MTC"), Mobility management Entity ("MME"), Multiple Input Multiple Output ("MIMO"), Multi User Shared Access ("MUSA"), Narrowband ("NB"), Next Generation (e.g., 5G) Node-B ("gNB"), Next Generation Radio Access Network ("NG-RAN"), New Radio ("NR", e.g., 5G radio access), New Data Indicator ("NDI"), Non-Orthogonal Multiple Access ("NOMA"), Orthogonal Frequency Division Multiplexing ("OFDM"), Packet Data Convergence Protocol ("PDCP"), Primary Cell ("PCell"), Physical Broadcast Channel ("PBCH"), Packet Data Network ("PDN"), Protocol Data Unit ("PDU"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Link Control ("RLC"), Radio Link Failure ("RLF"), Radio Link Monitoring ("RLM"), Radio Resource Control ("RRC"), Random-Access Procedure ("RACH"), Random Access Response ("RAR"), Radio Network Temporary Identifier ("RNTI"), Reference Signal ("RS"), Reference Signal Received Power ("RSRP"), Remaining Minimum System Information ("RMSI"), Resource Block Assignment ("RBA"), Resource Spread Multiple Access ("RSMA"), Round Trip Time ("RTT"), Receive ("RX"), Sparse Code Multiple Access ("SCMA"), Scheduling Request ("SR"), Signaling Radio Bearer ("SRB," e.g., carrying control plane data), Single Carrier Frequency Division Multiple Access ("SC-FDMA"), Secondary Cell ("SCell"), Secondary Cell Group ("SCG"), Shared Channel ("SCH"), Signal-to-Interference-Plus-Noise Ratio ("SINR"), Serving Gateway ("SGW"), Service Data Unit ("SDU"), Sequence Number ("SN"), Session Management Function ("SMF"), System Information ("SI"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("the UE"), Uplink ("UL"), User Plane ("UP"), Universal Mobile Telecommunications System ("UMTS"), Uplink Pilot Time Slot ("UpPTS"), Ultra-reliability and Low-latency Communications ("URLLC"), Wireless Local Area Network ("WLAN"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, such as LTE, a UE reports extended power headroom report ("PHR") or carrier aggregation, i.e., it reports power headroom ("PH") info for each activated serving cell together with $P_{CMAX}$, the total maximum UE transmit power. Because the subframe/TTI length is in LTE same for all carriers the PHR reporting subframes, the subframes to which the power headroom information refers are aligned. However, some wireless communication networks, such as the 3GPP 5G NR, support carriers with different OFDM numerologies and/or different TTIs.

BRIEF SUMMARY

Methods for reporting power headroom information are disclosed. Apparatuses and systems also perform the functions of the methods. The methods may also be embodied in one or more computer program products comprising executable code.

In one embodiment, a first method for reporting power headroom information includes the UE communicating with a base unit using a first uplink carrier and a second uplink carrier concurrently. Here, each carrier has a different transmission duration unit length, wherein the first uplink carrier has a longer transmission duration unit length than the second uplink carrier. The first method includes receiving an uplink resource allocation for a first transmission duration unit on the first uplink carrier and determining a third transmission duration unit on the second uplink carrier. Here, the first transmission duration unit overlaps in time with at least two second transmission duration units on the second uplink carrier and the third transmission duration unit comprises at least one of the second transmission duration units. The first method includes calculating PH information for the second uplink carrier associated with the third transmission duration unit and reporting the PH information in an uplink transmission on the first transmission duration unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9 is a block diagram illustrating a fifth embodiment of a scenario where a UE aggregates carriers configured with different TDU lengths;

FIG. 10 is a block diagram illustrating a sixth embodiment of a scenario where a UE aggregates carriers configured with different TDU lengths.

DETAILED DESCRIPTION

Figure 1:
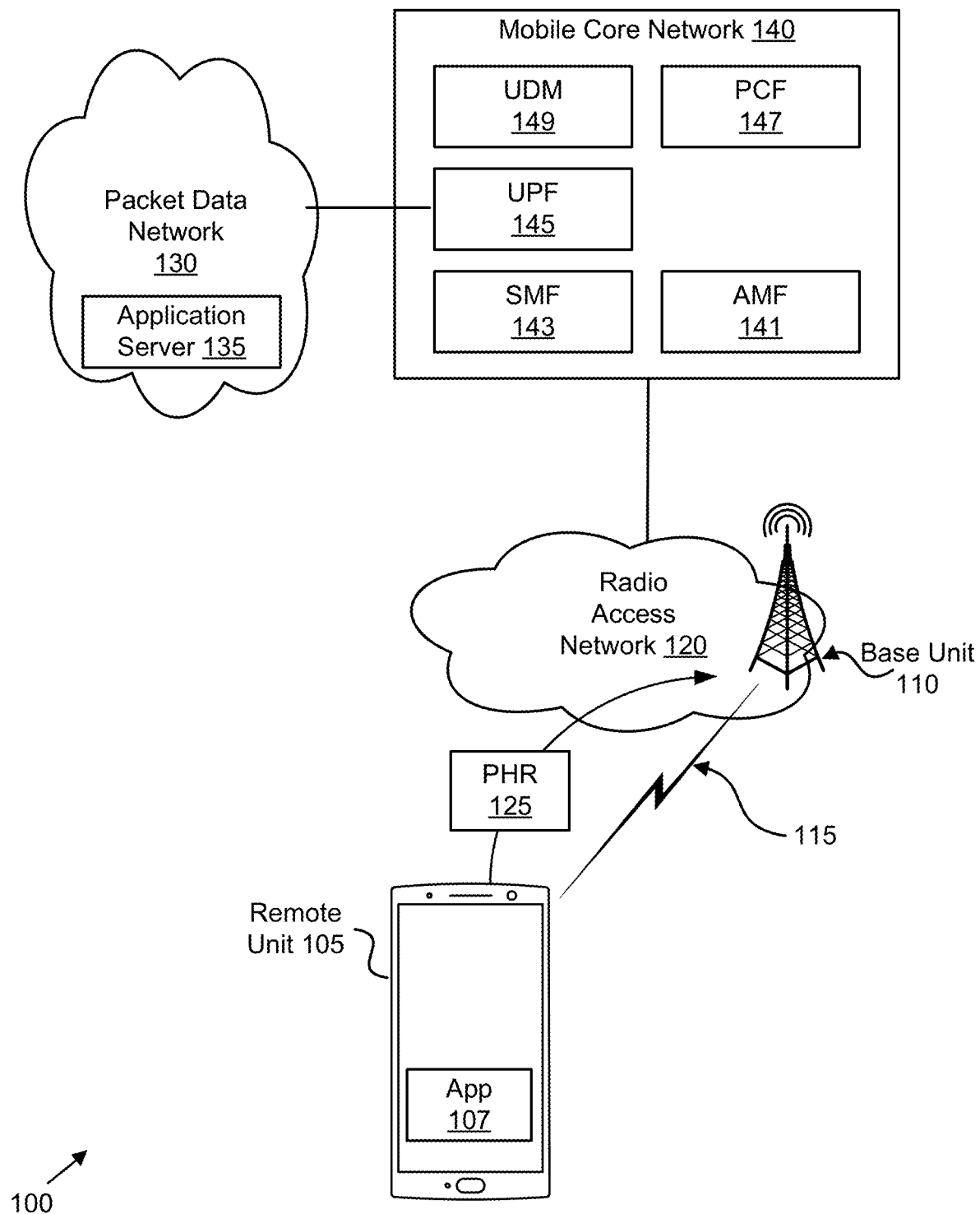
FIG. 1 is a schematic block diagram illustrating one embodiment of a wireless communication system for reporting power headroom information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for reporting power headroom information when UE is configured with multiple uplink carriers, e.g. in a carrier aggregation deployment, respectively serving cells, for example by a UE communicating with a radio network using a first UL carrier and a second UL carrier concurrently.

In various embodiments, the UE receives an UL resource allocation for a first transmission duration unit on the first UL carrier. Here, the first transmission duration unit overlaps in time with at least two second transmission duration units on the second UL carrier. The UE identifies a third transmission duration unit on the second UL carrier. Here, the third transmission duration unit comprises at least one of the second transmission duration units. The UE calculates power headroom ("PH") information for the second UL carrier associated with the third transmission duration unit and reports the PH information in an UL transmission on the first transmission duration unit.

In some embodiments, each of the first and second UL carriers is associated with a different serving cell. In some embodiments, the UE may receive an UL resource allocation for at least one of the overlapping second transmission duration units on the second UL carrier.

In some embodiments, the first transmission duration unit corresponds to a slot on the first UL carrier and the second transmission duration unit corresponds to a slot on the second UL carrier. For example, the base unit may be a gNB in a 5G RAN, where the first UL carrier is configured with a first subcarrier spacing ("SCS") and the second UL carrier is configured with a second SCS, the first SCS being smaller than the second SCS. Accordingly, the first UL carrier will have slots with longer time-duration than the second UL carrier, such that multiple second slots on the second UL carrier fully overlap with the first slot.

In such embodiments, the UE calculates PH information for a first physical UL shared channel ("PUSCH") scheduled on the first of the multiple second slots that fully overlaps with the first slot on the first UL carrier. Here, reporting PH information for the second UL carrier in an UL transmission on the first slot may include the UE transmitting on a PUSCH a power headroom report ("PHR") that contains the PH information for the first PUSCH. In certain embodiments, In some embodiments, the first transmission duration unit corresponds to a transmit time interval ("TTI") of the first UL carrier and the second transmission duration unit corresponds to a TTI of the second UL carrier. In certain embodiments, the first UL carrier is configured with a first TTI length and the second UL carrier is configured with a second TTI length, wherein the first TTI length is larger than the second TTI length. For example, the base unit may be an LTE eNB, wherein the second TTI length corresponds to a shortened TTI ("sTTI") length. Moreover, the first TTI length may also correspond to a sTTI.

In such embodiments, calculating PH information for the second UL carrier associated with the third transmission duration unit comprises the UE calculating PH for a TTI duration longer than the second TTI length. In certain embodiments, the length of the third transmission duration unit (e.g., third TTI) is greater than the length of the first TTI. In certain embodiments, the third transmission duration unit (e.g., third TTI) is equal to a subframe. In certain embodiments, calculating PH information for the second UL carrier associated with the third transmission duration unit comprises calculating PH information for a subframe containing the first TTI. In certain embodiments, the third transmission duration unit contains multiple TTIs of the second UL carrier (e.g., the third TTI overlaps multiple sTTIs on the second UL carrier).

In some embodiments, the UE calculates the PH information according to a predefined reference format. In certain embodiments, the processor calculates the PH information assuming the apparatus is not scheduled to transmit a PUSCH in the third transmission duration unit.

In various embodiments, the reported PH information comprises a power headroom level computed based on the UL resource allocation. In some embodiments, TTIs of the second UL carrier are configured with a smaller TTI length than TTIs of the first UL carrier, wherein the at least one second TTI on the second UL carrier has a shortened TTI length that is less than 1 millisecond. In some embodiments, the PH information is calculated based on an uplink resource allocation received for the third transmission duration unit. In such embodiments, the uplink transmission on the third transmission duration may be either stopped or dropped.

FIG. 1 depicts a wireless communication system 100 for receiving system information at a UE, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

While FIG. 1 depicts components of a 5G RAN and a 5G core network, the described embodiments for PHR reporting 125 in a wideband carrier apply to other types of communication networks, including IEEE 802.11 variants, UMTS, LTE variants, CDMA 2000, Bluetooth, and the like. For example, in an LTE/EPC variant, the AMF 141 may be mapped to an MME, the SMF 143 may be mapped to a control plane portion of a PGW, the UPF 145 may be mapped to a STW and a user plane portion of the PGW, etc.

To assist the base unit 110 to schedule uplink transmission resources to different remote units 105 in an appropriate way, each remote unit 105 reports its available power headroom ("PH") to the base unit 110, e.g., using a power headroom report ("PHR") 125. Using a received PHR, the base unit 110 may determine how much more uplink bandwidth per sub-frame a remote unit 105 is capable of using, i.e. how close to its transmission power limits the remote unit 105 is operating. The PH indicates the difference between the maximum UE uplink transmit power and the estimated power for UL-SCH transmission. In various embodiments, the remote unit 105 power headroom (PH) in dB valid for sub-frame "i" is defined by:

$$PH(i) = P_{CMAX} - \{10 \log_{10}(M_{PUSCH}(i)) + P_{0\_PUSCH}(j) + \alpha(j) \cdot PL + \Delta_{TF}(i) + f(i)\} \quad \text{Equation 1}$$

Here, $P_{CMAX}$ is the total maximum UE transmit power and is a value chosen by the user equipment in the given range of $P_{CMAX\_L}$ and $P_{CMAX\_H}$ based on the following constraints:

$$P_{CMAX\_L} \leq P_{CMAX} \leq P_{CMAX\_H} \quad \text{Equation 2}$$

$$P_{CMAX\_L} = \min(P_{EMAX} - \Delta T_C, P_{PowerClass} - MPR - AMPR - \Delta T_C) \quad \text{Equation 3}$$

$$P_{CMAX\_H} = \min(P_{EMAX}, P_{PowerClass}) \quad \text{Equation 4}$$

Here, $P_{EMAX}$ is a value signaled by the network. The MPR is a power reduction value used to control the adjacent channel leakage power ratio (ACLR) associated with the various modulation schemes and the transmission bandwidth. AMPR is the additional maximum power reduction. It is a band specific value and applied by the UE when configured by the network. One example of values for $\Delta T_C$, MPR and AMPR may be found in 3GPP TS36.101.

In various embodiments, the remote unit 105 sends the PHR 125 as a MAC Control Element ("MAC CE"). The base unit 110 may configure parameters to control various triggers for reporting power headroom depending on the system load and the requirements of its scheduling algorithm.

In various embodiments, the range of the power headroom report is from +40 to −23 dB. Note that negative part of the range enables the remote unit 105 to signal to the base unit 110 the extent to which it has received an UL grant which would require more transmission power than the remote unit 105 has available. The base unit 110 may then reduce the amount of uplink resources in a subsequent grant (dynamic or semi-static), thus freeing up transmission resources which could be then allocated to other remote units.

In various embodiments, the power headroom report 125, e.g., PHR MAC CE, may only be sent in a sub-frame for which the remote unit 105 has a valid uplink resource, i.e., a PUSCH resource. In general, the PHR 125 relates to the sub-frame in which it is sent and is therefore an estimation or prediction rather than a direct measurement (because the remote unit 105 cannot directly measure its actual transmission power headroom for the subframe in which the report is to be transmitted).

In various embodiments, the remote unit 105 is configured for carrier aggregation, wherein the remote unit 105 used at least a first carrier and a second carrier concurrently. Each component carrier (e.g., the first and second carriers) may be associated with a different serving cell. Where the remote unit 105 is configured with multiple concurrent serving cells, the power headroom defined in Equation 1 is calculated and reported for each serving cell/component carrier. For the case of carrier aggregation, the remote unit 105 must consider both the total maximum UE transmit power $P_{CMAX}$ and a component carrier-specific maximum transmit power $P_{CMAX,c}$.

Because simultaneous PUSCH-PUCCH transmission is supported in carrier aggregation, two different types of PH types are supported for CA. PH type 1 indicates the difference between $P_{CMAX,c}$ and estimated PUSCH power, while PH type 2 indicates the difference between $P_{CMAX,c}$ and estimated power of PUSCH and PUCCH combined. Note that PH type 2 is only applicable for PCell, whereas PH type 1 is applicable for both PCell and SCell. Because it is beneficial for the base unit 110 to always know the power situation for all activated uplink carrier/serving carrier for future uplink scheduling, the remote unit 105 may transmit an extended PH MAC CE on one of the serving cells (PCell and SCells) which has a valid uplink resource for PUSCH. The extended PH MAC CE includes power headroom information (Type1/Type2) for each activated uplink component carrier.

While the following solutions are discussed in the context of carrier aggregation, the principles described herein are also applicable to Dual connectivity (DC) which allows a remote unit 105 to receive data simultaneously from different base units 110 in order to boost the performance in a heterogeneous network with dedicated carrier deployment. In Dual Connectivity when a PHR has been triggered, the UE sends power headroom information for all activated cells (including serving cells of both cell groups) to the eNB. When UE reports PH info of secondary cell group ("SCG") cells to the main base unit 110 (e.g., MeNB) or PH info of main cell group ("MCG") cells to the secondary base unit 110 (e.g., SeNB), Type2 PH information for the PUCCH cell (PUCCH for the SCG) is included. Power headroom info for the serving cells in the other CG may be calculated based on some reference format (e.g., virtual PHR) or based on actual PUSCH/PUCCH transmissions.

In various embodiments, the remote unit 105 may be configured with a Short Processing Time (SPT) and a shorter TTI length. Short Transmission Time Interval (Short TTI) provides support for TTI length shorter than 1 ms DL-SCH and UL-SCH. To support the short TTI, the associated control channels, shortened PDCCH ("sPDCCH," containing downlink control information (DCI) for short TTI operation, referred to as "sDCI") and shortened PUCCH ("sPUCCH") are also transmitted with duration shorter than 1 ms. Over the physical layer, DL and UL transmissions use either slots or subslots when short TTI is configured. Recall that in LTE there are 2 slots of 7 OFDM/SC-FDMA symbol duration in a subframe. As used herein, a "subslot" refers to a transmission duration unit of either 2 OFDM/SC-FDMA symbol or 3 OFDM/SC-FDMA symbol duration. As such, three "subslots" fit within a slot. To support the short TTI, the remote unit 105 transmits (sub)slot-based PUSCH (also referred to as shortened PUSCH or "sPUSCH").

In various embodiments, the RAN 120 may support different OFDM numerologies, i.e. sub-carrier spacing (SCS), CP length, in a single framework, e.g., to support use cases/deployment scenarios with diverse requirements in terms of data rates, latency, and coverage. For example, eMBB is to support peak data rates (e.g., 20 Gbps for downlink and 10 Gbps for uplink) while URLLC is to support ultra-low latency (0.5 ms for UL and DL each for user plane latency) and high reliability (1-10-5 within 1 ms). Therefore, the OFDM numerology that is suitable for one use case might not work well for another. Note that different OFDM numerologies have different subcarrier spacings, affecting OFDM symbol duration, cyclic prefix (CP) duration, and number of symbols per scheduling interval. Different numerologies may occur across different carrier(s) for a given UE as well as different numerologies within the same carrier for a given UE, i.e. different OFDM numerologies are multiplexed in frequency-domain and/or time-domain within the same carrier or across different carriers.

When carrier aggregation is combined with different numerologies for NR or, for LTE, with shortened TTI, one transmission duration unit ("TDU", e.g., NR slot or LTE TTI) of a carrier can overlap (coincide) with multiple TDUs of another carrier. In this case the base unit 110, may not be aware which TDU the power headroom information refers to. For example, in a scenario where an extended PHR report is triggered and subsequently transmitted in a slot/TTI, which overlaps with multiple slots/TTIs on a different carrier, the base unit 110 does not know which of the overlapped slot/TTI from the multiple slots/TTIs is the reference for the PH calculation. Without knowledge of the reference TDU, the base unit 110 may establish its future scheduling decisions on wrong assumptions, i.e. how close the UE is operating on the power limit, which may lead to either power scaling or under-utilization of resources. Note that data transmissions may be scheduled to span one or multiple UL TDUs (e.g., slots/TTIs). Similarly, multiple data transmissions (e.g., PUSCH transmissions) also may be scheduled within one slot, which is also referred to as e.g. sub-slot as outlined below.

In various embodiments, the remote unit 105 is configured with different UL TDU lengths for different serving cells, e.g. for a carrier aggregation. With possible simultaneous UL transmissions using different PUSCH durations across serving cells, a base unit 110, e.g., gNB or eNB, needs to know which TDU a power headroom calculation is based on, so that it correctly interprets a received PHR and to enable the base unit 110 to schedule subsequent transmissions (e.g., sTTI/TTI/slot) properly. As discussed above, the PHR provides the base unit 110 with information on path loss, TPC status and the used MPR for the corresponding uplink transmission.

In certain embodiments, the remote unit 105 may receive indications from the base unit 110 of sets of frequency domain resource blocks for possible PUSCH data transmission in uplink of a first TDU length on a first component carrier and a second TDU length on the second component carrier. In one embodiment, the remote unit 105, having been allocated resources for PUSCH on the first carrier, then identifies a TDU on the second carrier computes a PHR for the second carrier based on the identified TDU. In certain embodiments, the remote unit 105 may derive (and indicate to the base unit 110) a reference TDU index (e.g., slot index or TTI index) associated with the PHR for the second carrier. The remote unit 105 transmits the PHR for the second carrier to the base unit 110.

Figure 2:
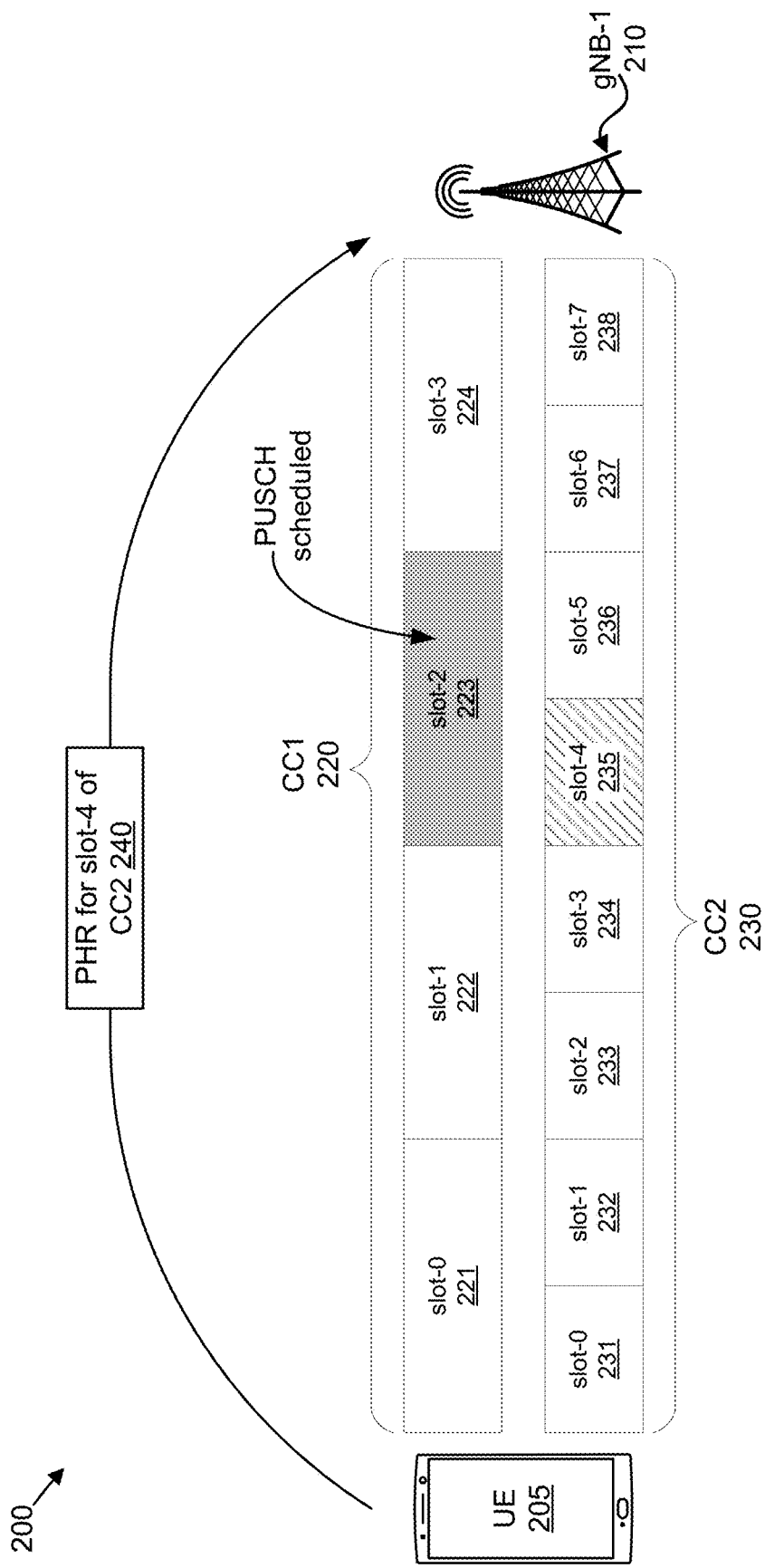
FIG. 2 is a block diagram illustrating one embodiment of a RAN for reporting power headroom information.

FIG. 2 depicts an access network 200 for reporting power headroom information, according to embodiments of the disclosure. The access network 200 include a UE 205 that uses two UL carriers concurrently, a first component carrier ("CC1") 220 and a second component carrier ("CC2"). In various embodiments, each component carrier is associated with a different serving cell. In the depicted embodiment, the first carrier 220 and the second component carrier 230 are associated with the same RAN node ("gNB-1") 210, e.g., a Carrier Aggregation scenario. Here, the RAN node 210 may be gNB in a 5G-RAN.

The first component carrier 220 has transmission duration units of longer length than the second component carrier 230. In various embodiments, these transmission duration units correspond to slots in NR with the first component carrier being configured with a smaller subcarrier spacing ("SCS") than the second component carrier. As such, multiple slots on the second component carrier 230 fit within a single slot on the first component carrier 220. In the depicted embodiment, one slot of the first component carrier 220 overlaps with two slots of the second component carrier 230.

As depicted, the first component carrier 220 includes a first slot 221 (denoted "slot-0"), a second slot 222 (denoted "slot-1"), a third slot 223 (denoted "slot-2"), and a fourth slot 224 (denoted "slot-3"). At the same time, the second component carrier 230 includes a first slot 231 (denoted "slot-0"), a second slot 232 (denoted "slot-1"), a third slot 233 (denoted "slot-2"), a fourth slot 234 (denoted "slot-3"), a fifth slot 235 (denoted "slot-4"), a sixth slot 236 (denoted "slot-5"), a seventh slot 237 (denoted "slot-6"), and an eighth slot 238 (denoted "slot-7"). While the depicted embodiment shows alignment of the slot boundaries, in other embodiments the slot boundaries of the first component carrier 220 do not coincide with slot boundaries of the second component carrier 230.

In the access network 200, the UE 205 is allocated uplink resources in the slot 223, denoted "slot-2", on the first component carrier 220. Here, the allocated resources may correspond to an active bandwidth part on the first component carrier 220. Note that the slot 223 overlaps with the slots 235 and 236 on the second component carrier 230. Here, the UE 205 provides a type1 PHR for slot 223 of the first carrier 220 in a PUSCH transmission on slot 223. Moreover, the UE 205 provides a PHR for the first PUSCH, if any, on the first of the multiple slots on the second carrier 230 (e.g., on an active bandwidth part of the second carrier 230) that fully overlaps with the slot 223. Here, the slot 235 is the first slot on the second carrier to fully overlap with the slot 223. Thus, the UE 205 calculates a PHR (e.g., a type1 PHR) for the slot 235 and sends it to the network in the PUSCH transmission on slot 223 (e.g., sends the PHR 240 over the first carrier 220).

In certain embodiments, the slot 235 and slot 236 are scheduled for uplink transmission (e.g., PUSCH). Here, the uplink grants for these slots may include dynamic grants and/or configured (e.g., semi-persistent) grants. In one embodiment, the slots 235 and 236 may be scheduled individually. In another embodiment, the slots 235 and 236 are scheduled via a multi-slot grant. In certain embodiments, the UE 205 computes an "actual" PHR for the second component carrier. As used herein, "actual" PH refers to a power headroom level calculates based on actual transmissions. In contrast, "virtual" PH refers to a power headroom level calculated based on a predefined reference format.

Figure 3:
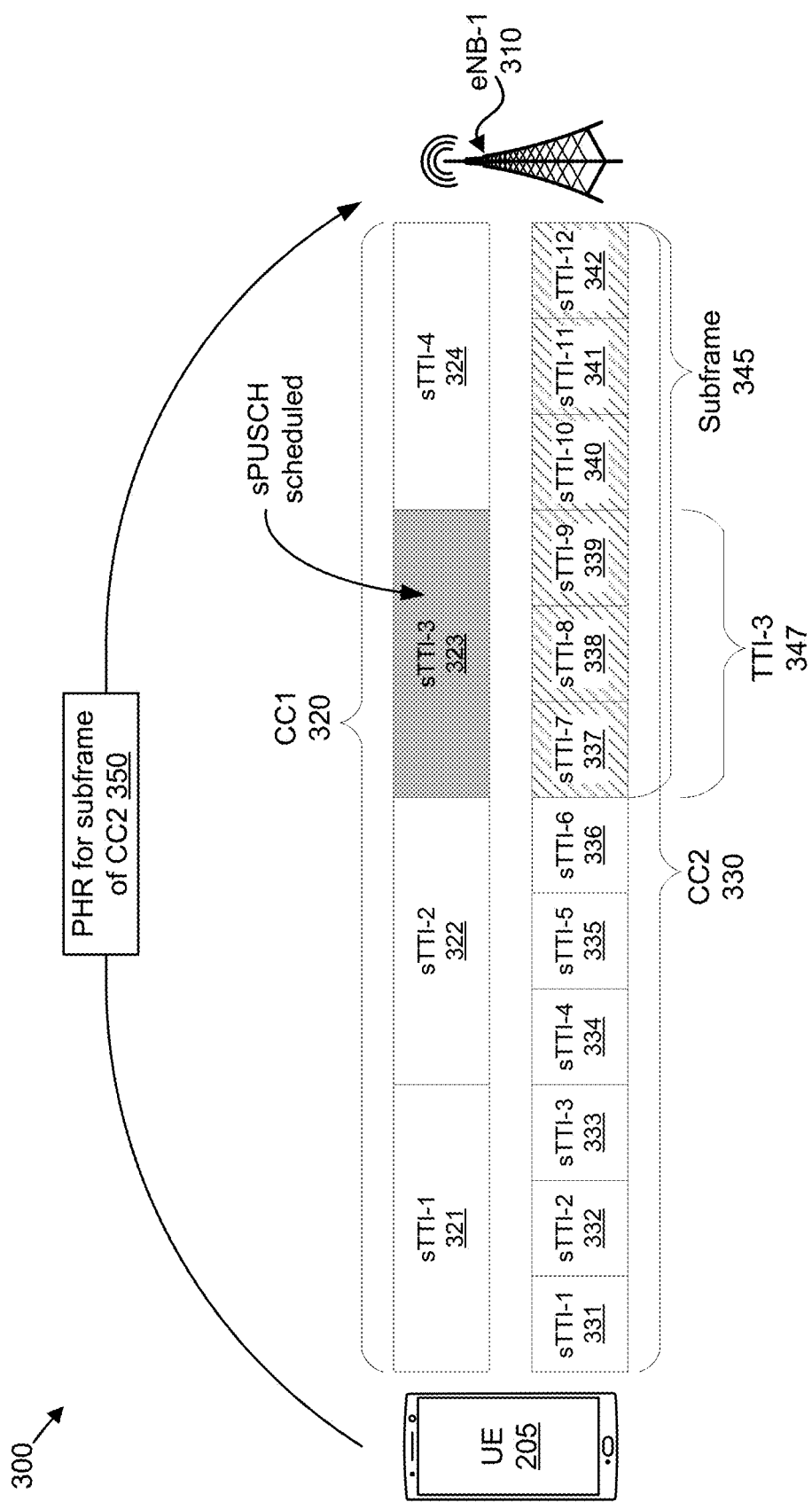
FIG. 3 is a block diagram illustrating another embodiment of a RAN for reporting power headroom information.

FIG. 3 depicts an access network 300 for reporting power headroom information, according to embodiments of the disclosure. The access network 300 includes the UE 205 that uses two UL carriers concurrently, a first component carrier ("CC1") 320 and a second component carrier ("CC2"). In the depicted embodiment, the first carrier 320 and the second component carrier 330 are associated with a first RAN node ("eNB-1") 310. Here, the RAN node 310 may be eNB in a LTE-RAN.

The first component carrier 320 has transmission duration units of longer length than the second component carrier 330. In various embodiments, these transmission duration units correspond to TTIs, for example short TTIs (sTTIs) in LTE as depicted, with the first component carrier being configured with a longer TTI length than the second component carrier. As such, multiple sTTIs on the second component carrier 330 fit within a single sTTI on the first component carrier 320. In the depicted embodiment, one sTTI of the first component carrier 320 overlaps with three sTTIs of the second component carrier 330. Here, the first component carrier is configured with a slot-length TTI (e.g., 7 OFDM symbols in duration) and the second component carrier 330 is configured with subslot-length TTI (e.g., 2 or 3 OFDM symbols in duration; here in a "2-2-3" pattern, such that every three sTTIs add up to 7 OFDM symbols).

As depicted, the first component carrier 320 includes a first sTTI 321 (denoted "sTTI-1"), a second sTTI 322 (denoted "sTTI-2"), a third sTTI 323 (denoted "sTTI-3"), and a fourth sTTI 324 (denoted "sTTI-4"). At the same time, the second component carrier 330 includes a first sTTI 331 (denoted "sTTI-1"), a second sTTI 332 (denoted "sTTI-2"), a third sTTI 333 (denoted "sTTI-3"), a fourth sTTI 334 (denoted "sTTI-4"), a fifth sTTI 335 (denoted "sTTI-5"), a sixth sTTI 336 (denoted "sTTI-6"), a seventh sTTI 337 (denoted "sTTI-7"), an eighth sTTI 338 (denoted "sTTI-8"), a ninth sTTI 339 (denoted "sTTI-9"), a tenth sTTI 340 (denoted "sTTI-10"), an eleventh sTTI 341 (denoted "sTTI-11"), and a twelfth sTTI 342 (denoted "sTTI-12"). While the depicted embodiment shows alignment of the sTTI boundaries, in other embodiments the sTTI boundaries of the first component carrier 320 do not coincide with sTTI boundaries of the second component carrier 330.

In the access network 300, the UE 205 is allocated uplink resources in the sTTI 323, denoted "sTTI-3", on the first component carrier 320. Note that the sTTI 323 overlaps with the sTTIs 337, 338 and 339 on the second component carrier 330. Here, the UE 205 provides a PHR for sTTI 323 of the first carrier 320 in a PUSCH transmission on sTTI 323. Moreover, the UE 205 provides a PHR 350 for time duration unit on the second carrier 330 that is larger than the sTTI length(s) of the second carrier 330. In the depicted embodiment, the UE 205 calculates a PHR for a subframe-length TDU on the second carrier 330. Here, the UE 205 computes the Power headroom for the subframe 345 on the second carrier containing the sTTI 323 with the PUSCH allocation on the first carrier. In other embodiments, the UE 205 calculates a PHR for a slot-length TDU on the second carrier, denoted as "TTI-3" 347.

In certain embodiments, the sTTIs 337-339 are scheduled for uplink transmission (e.g., PUSCH). Here, the uplink grants for these sTTIs may include dynamic grants and/or configured (e.g., semi-persistent) grants. In one embodiment, the sTTIs 337-339 may be scheduled individually. In another embodiment, the sTTIs 337-339 are scheduled via a multi-sTTI grant. In certain embodiments, the UE 205 computes an "virtual" PHR for the second component carrier. As used herein, "virtual" PH refers to a power headroom level calculated based on a predefined reference format. In other embodiments, the UE 205 may compute an "actual" PHR for the second component carrier.

Figure 4:
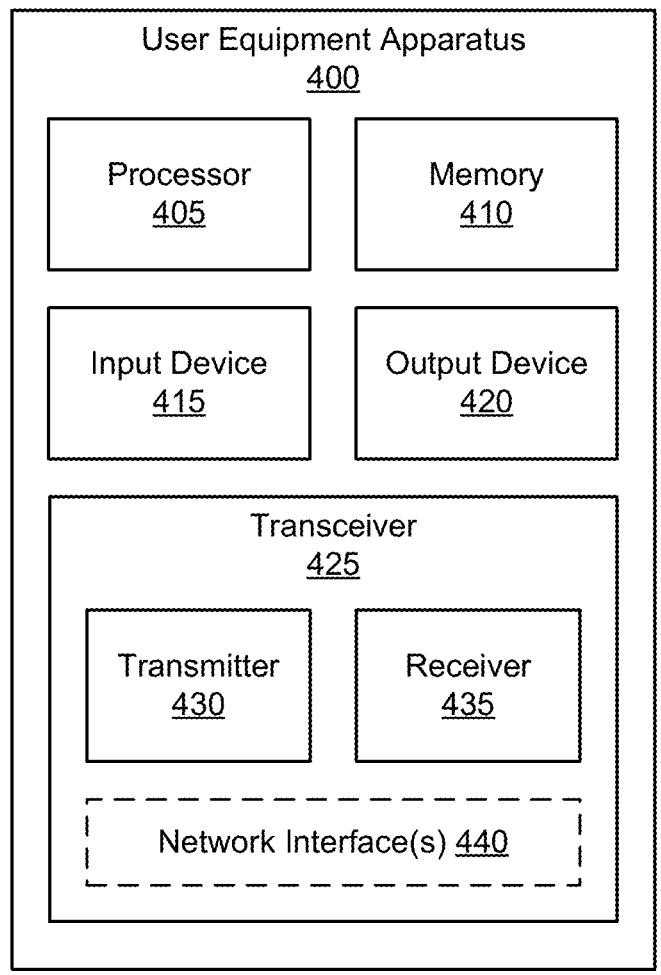
FIG. 4 is a schematic block diagram illustrating one embodiment of an apparatus that may be used for reporting power headroom information.

FIG. 4 depicts a user equipment apparatus 400 that may be used for reporting power headroom information, according to embodiments of the disclosure. The user equipment apparatus 400 may be one embodiment of the remote unit 105 and/or the UE 205, described above. Furthermore, the user equipment apparatus 400 may include a processor 405, a memory 410, an input device 415, an output device 420, a transceiver 425 for communicating with one or more base units 110.

As depicted, the transceiver 425 may include a transmitter 430 and a receiver 435. The transceiver 425 may also support one or more network interfaces 440, such as the Uu interface used to communicate with a gNB, or other suitable interface for communicating with the RAN 120. In some embodiments, the input device 415 and the output device 420 are combined into a single device, such as a touchscreen. In certain embodiments, the user equipment apparatus 400 may not include any input device 415 and/or output device 420.

In various embodiments, the transceiver 425 communicates with a base unit using a first uplink carrier and a second uplink carrier concurrently. Here, each carrier has a different transmission duration unit length, wherein the first uplink carrier has a longer transmission duration unit length than the second uplink carrier. At some point in time, the processor 405 receives an uplink resource allocation for a first transmission duration unit on the first uplink carrier and determines a third transmission duration unit on the second uplink carrier. Here, the first transmission duration unit overlaps in time with at least two second transmission duration units on the second uplink carrier and the third transmission duration unit comprises at least one of the second transmission duration units. The processor 405 calculates power headroom ("PH") information for the second uplink carrier associated with the third transmission duration unit and reports, via the transceiver 425, the PH information in an uplink transmission on the first transmission duration unit.

In some embodiments, each of the first and second uplink carriers is associated with a different serving cell. In some embodiments, the processor further receives an uplink resource allocation for at least one of the overlapping second transmission duration units on the second uplink carrier.

In some embodiments, the first transmission duration unit corresponds to a slot on the first uplink carrier and the second transmission duration unit corresponds to a slot on the second uplink carrier. In certain embodiments, multiple second slots on the second uplink carrier fully overlap with the first slot. In such embodiments, the processor 405 calculates PH information for a first physical uplink shared channel ("PUSCH") scheduled on the first of the multiple second slots that fully overlaps with the first slot on the first uplink carrier, wherein reporting PH information for the second uplink carrier in an uplink transmission on the first slot comprises transmitting on a PUSCH a power headroom report ("PHR") that contains the PH information for the first PUSCH. In certain embodiments, the first uplink carrier is configured with a first subcarrier spacing ("SCS") and the second uplink carrier is configured with a second SCS, wherein the first SCS is smaller than the second SCS.

In some embodiments, the first transmission duration unit corresponds to a transmit time interval ("TTI") of the first uplink carrier and the second transmission duration unit corresponds to a TTI of the second uplink carrier. In certain embodiments, the first uplink carrier is configured with a first TTI length and the second uplink carrier is configured with a second TTI length, wherein the first TTI length is larger than the second TTI length. In such embodiments, calculating PH information for the second uplink carrier associated with the third transmission duration unit comprises calculating PH for a TTI duration longer than the second TTI length.

In certain embodiments, the length of the third transmission duration unit is greater than the length of the first TTI. In certain embodiments, the third transmission duration unit is equal to a subframe. In certain embodiments, calculating PH information for the second uplink carrier associated with the third transmission duration unit comprises calculating PH information for a subframe containing the first TTI. In certain embodiments, the third transmission duration unit contains multiple TTIs of the second uplink carrier.

In some embodiments, the processor 420 calculates the PH information according to a predefined reference format. In certain embodiments, the processor 420 calculates the PH information assuming the apparatus is not scheduled to transmit a PUSCH in the third transmission duration unit.

In various embodiments, the reported PH information comprises a power headroom level computed based on the uplink resource allocation. In some embodiments, the at least one of the second transmission duration units on the second uplink carrier (e.g., second TTI on the second uplink carrier) has a shortened TTI length that is less than 1 millisecond. In some embodiments, the PH information is calculated based on an uplink resource allocation received for the third transmission duration unit. In such embodiments, the uplink transmission on the third transmission duration may be either stopped or dropped.

In some embodiments, the transceiver 425 receives a first indication (e.g., first UL resource grant) from a mobile communication network (e.g., from the base unit 110) indicating a first set of frequency domain resource blocks for possible PUSCH data transmission and at least one uplink transmission duration unit ("TDU") of a first TDU length on a first component carrier. The transceiver 425 may also receive a second indication (e.g., second UL resource grant) from the mobile communication network indicating a second set of frequency domain resource blocks for possible PUSCH data transmission and at least one uplink TDU of a second TDU length on the second component carrier. Here, the first component carrier and the second component carrier are configured with different TDU lengths (e.g., different TTI/sTTI lengths in an LTE deployment or different slot lengths in an NR deployment).

The processor 405 computes a first PHR based on at least one of: transmissions of the first TDU length only being present in a first TDU on the first carrier, and a reference format. In certain embodiments, the processor 405 may also select at least one second TDU of the second TDU length on the second component carrier and compute a second PHR based on at least one of: transmissions of the second TDU length only being present in the selected second TDU on the second component carrier, and a reference format. Moreover, the processor 405 may derive a reference TDU index associated with the second PHR.

The processor 405 controls the transceiver 425 to transmit at least the first PHR and the second PHR to the base unit (e.g., gNB or eNB). Here, the second TDU length is shorter than the first TDU length, such that the first TDU encompasses one or more TDUs of the second TDU length. For example, an integer number of TDUs of the second TTI length may fit within the time duration of the first TDU.

In one embodiment, the second indication is an RRC configuration assigning the second set of frequency domain resource blocks for possible PUSCH data transmissions (e.g., a configured UL grant, such as semi-persistent scheduling). Additionally, the RRC configuration may further indicate at least one of the modulation encoding scheme ("MCS") and a transport block size ("TBS") index. In such embodiments, the second PHR may contain a power headroom value computed based on transmissions of the second TTI length only being present in the second TTI on the second component carrier.

Additionally, in the above embodiments computing the second PHR may be based on the allocation of the second set of frequency domain resource blocks, irrespective of the presence of transmissions in the second TTI on the second component carrier (e.g., the processor 405 calculates the second PHR assuming that PUSCH transmissions will occur on the one or more second TDUs, even if PUSCH is actually not transmitted on the one or more second TDUs). In such embodiments, a configured maximum transmit power value (e.g., $P_{CMAX,c}$) may be included in the second PHR.

In certain embodiments, the first PHR and at least the second PHR are transmitted via a single PHR MAC control element. In certain embodiments, the reference TDU index is derived based on at least the second TDU index within the first TDU.

In some embodiments, the processor 405 selects a second TDU from a set of TDUs of the second TDU length within the first TDU. Here, the processor 405 may select the earliest scheduled TDU of the second TDU length within the first TDU for uplink transmission. In another embodiment, the processor 405 may select the second TDU from the set of TDUs of the second TDU length within the first TDU based on the scheduled TDU of the second TDU length within the first TDU for uplink transmission having a smallest power headroom field value among the scheduled TDU of the second TDU length within the first TDU for uplink transmission. In a third embodiment, the second TDU selected from a set of TDUs of the second TDU length within the first TDU based on the earliest scheduled TDU of the second TDU length within the first TDU for uplink transmission if no PHR is due on any earlier TTI of the second TTI length within the first TDU, and otherwise based on the earliest TDU of the second TDU length within the first TDU for which a PHR is due.

In some embodiments, computing the second PHR is based on the reference format (e.g., a virtual PHR). In such embodiments, the second PHR may be computed according to a third TTI with a third TTI length. In one such embodiment, the third TTI length is equal to one subframe (e.g., 1 ms). In an alternate embodiment, the third TTI length is the same as the first TTI length. Also, in such embodiments, uplink transmissions of the third TTI length may not be configured for the second component carrier. Moreover, in these embodiments the transmit power control command value may be a fixed value. Further, the second PHR calculation may be associated with fixed resource block allocation and a transmit power control command value the fixed value of the transmit power control command may be selected based on the third TTI length. In certain embodiments, the first component carrier belongs to the first PUCCH group and the second component carrier belongs to a second PUCCH group.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to reporting power headroom information. For example, the memory 410 may store one or more power headroom reports, e.g., of the first and second types described herein. Additionally, the memory 410 may store data for reporting power headroom information, such as PH values, resource allocations, TTI index, and the like. In certain embodiments, the memory 410 also stores program code and related data, such as an operating system or other controller algorithms operating on the remote unit 105.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 includes at least one transmitter 430 and at least one receiver 435. One or more transmitters 430 may be used to provide UL communication signals to a base unit 110, such as the PUSCH transmissions containing PHR described herein. Similarly, one or more receivers 435 may be used to receive DL communication signals from the base unit 110, as described herein. Although only one transmitter 430 and one receiver 435 are illustrated, the user equipment apparatus 400 may have any suitable number of transmitters 430 and receivers 435. Further, the transmitter(s) 425 and the receiver(s) 430 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

Figure 5:
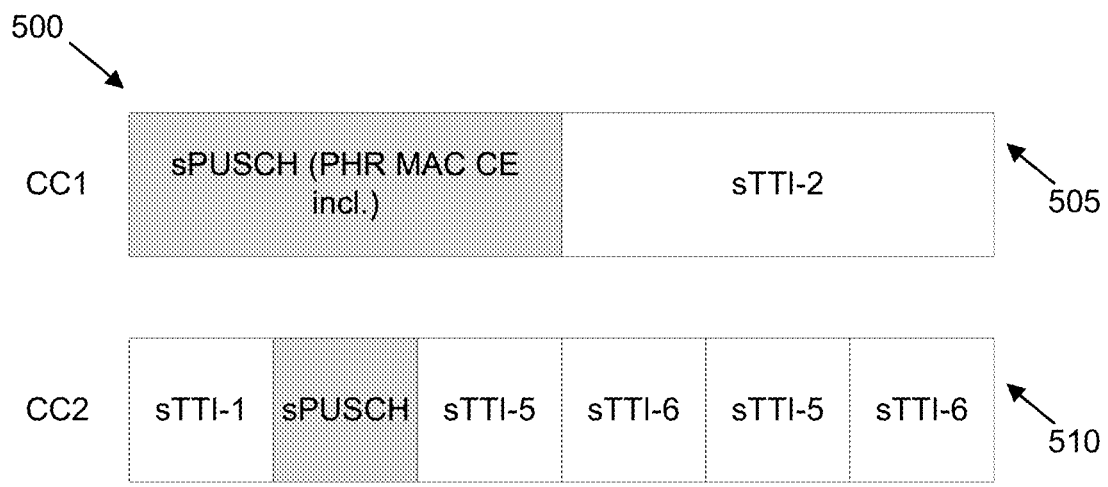
FIG. 5 is a block diagram illustrating a first embodiment of a scenario where a UE aggregates carriers configured with different TDU lengths.

FIG. 5 depicts a first scenario 500 where the UE 205 aggregates serving cells (e.g., in a carrier aggregation deployment) with different TDU lengths, according to various embodiments of the disclosure. Here, the UE aggregates a first component carrier (e.g., "CC1") 505 and second component carrier (e.g., "CC2") 510. In certain embodiments, both CC1 505 and CC2 510 are LTE carriers configured with a short TTI of different lengths, i.e. both TTI lengths are shorter than 1 ms. As depicted, one TTI of CC1 505 overlaps with 3 TTIs of CC2 510. As an example, one TTI on CC1 505 may correspond to an LTE slot (7 OFDM Symbol ("OS")), whereas an UL transmission on CC2 510 uses sub-slots (e.g., either two OFDM/SC-FDMA symbols or three OFDM/SC-FDMA symbols in duration). In other embodiments, the CC1 505 and CC2 510 are NR carriers configured with different OFDM numerologies, such that multiple NR slots on CC2 510 overlap with one NR slot on CC1 505.

In the first scenario 500, an uplink transmission on (s)PUSCH is scheduled for sTTI-1 on CC1 505. Here, the UE 205 multiplexes a PHR MAC CE in the sPUSCH in sTTI-1 on CC1 505. The UE 205 is further scheduled with an uplink transmission on (s)PUSCH in sTTI-2 on CC2 510.

According to one embodiment, the UE 205 reports Power headroom information for sTTI-2 on CC2 510 within the PHR MAC CE transmitted in sTTI-1 on CC1 505. Reporting the power headroom information for sTTI-2 on CC2 has the advantage that the UE 205 reports an actual PHR, i.e., PHR is reported for a scheduled TTI. The actual PHR provides information on the used MPR for the corresponding uplink transmission to the RAN node. Therefore, for cases when the UE 205 is scheduled for an uplink transmission in one of the overlapped TTIs, the UE 205 may report the actual PH for this scheduled TTI.

Figure 6:
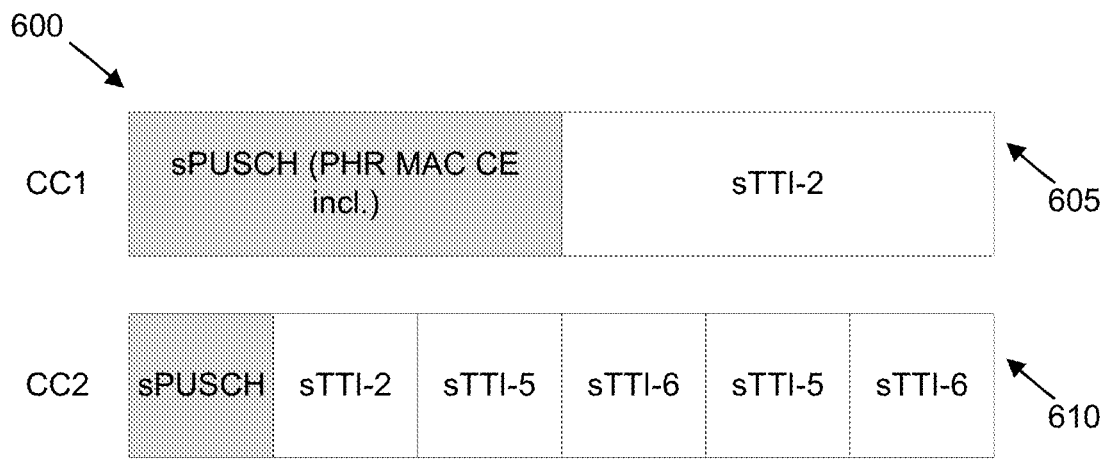
FIG. 6 is a block diagram illustrating a second embodiment of a scenario where a UE aggregates carriers configured with different TDU lengths.

FIG. 6 depicts a second scenario 600 where the UE 205 aggregates serving cells (e.g., in a carrier aggregation deployment) with different TTI lengths, according to various embodiments of the disclosure. Here, the UE 205 aggregates a first component carrier (e.g., "CC1") 605 and second component carrier (e.g., "CC2") 610. In certain embodiments, both CC1 505 and CC2 510 are LTE carriers configured with a short TTI of different lengths, such that one TTI on CC1 may correspond to an LTE slot, and three TTIs on CC2 fit within one TTI on CC1. In other embodiments, the CC1 605 and CC2 610 are NR carriers configured with different OFDM numerologies, such that multiple NR slots on CC2 610 overlap with one NR slot on CC1 605.

Note that in the second scenario 600, the UE is scheduled for sPUSCH on sTTI-1 of CC1 605 as well as sTTI-1 of CC2 610. In the second scenario 600, the UE 205 reports PH information for sTTI-1 of CC2 within the PHR MAC CE transmitted on CC1. In certain embodiments, when the UE 205 is scheduled for an uplink transmission in one of the overlapped TTIs, the UE 205 reports the power headroom information for this scheduled TTI, unless there is another sTTI having its PHR due before the PHR MAC CE is generated. Thus, in the first scenario 500 shown in FIG. 5 (e.g., sPUSCH at sTTI-2 of CC2 is scheduled with n+8 timing, i.e., 8 subslots before sTTI-2), the UE 205 may report PH information for sTTI-2 of CC2 within the PHR MAC CE transmitted on CC1 when no PHR is due in sTTI-1 of CC2 (e.g., due to expiration of periodicPHR-Timer). However, if there is a PHR due in sTTI-1 of CC2 then the UE 205 may instead report PH information for sTTI-1 of CC2 within the PHR MAC CE transmitted on CC1 and not that of sTTI-2 of CC2.

Figure 7:
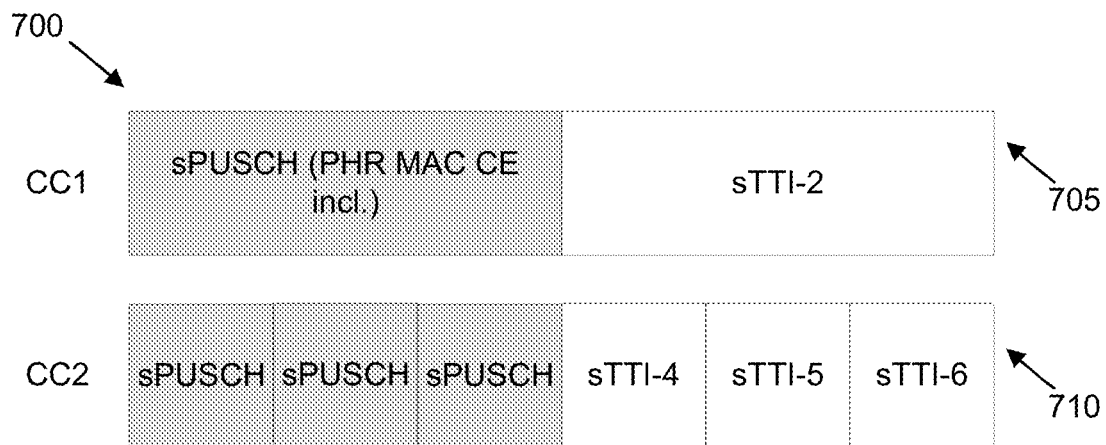
FIG. 7 is a block diagram illustrating a third embodiment of a scenario where a UE aggregates carriers configured with different TDU lengths.

FIG. 7 depicts a third scenario 700 where a UE aggregates serving cells (e.g., in a carrier aggregation deployment) with different TTI lengths, according to various embodiments of the disclosure. Here, the UE aggregates a first component carrier (e.g., "CC1") 705 and second component carrier (e.g., "CC2") 710. Note that in the third scenario 700, the UE is scheduled for sPUSCH on sTTI-1 of CC1 705 and also on sTTI-1, sTTI-2, and sTTI-3 of CC2 710.

For cases when there is only one of the overlapping TDUs on CC2 which is scheduled for an uplink transmission, the RAN node is aware for which TDU the UE 205 has reported power headroom information. However, in case several of the overlapping TDUs on CC2 are scheduled for an uplink transmission, then the RAN node and UE 205 need a common understanding for which of the overlapping TDUs the UE 205 is to report power headroom information. According to one embodiment, the UE 205 reports power headroom information for the first of the overlapping TDUs which are scheduled for an uplink transmission. One example of reporting for the first overlapping TDU is described above with reference to FIG. 2.

Given the third scenario 700, where all three overlapping (s)TTIs are scheduled for an uplink transmission, e.g., sPUSCH is scheduled in sTTI-1 through sTTI-3 on CC2 (e.g., via individual UL grants or via multi-TTI UL grant), the UE 205 may report power headroom information for sTTI-1 of CC2 710 within the PHR MAC CE transmission on CC1 705. In an alternative embodiment the UE 205 reports power headroom information for the last scheduled overlapping sTTI (e.g., sTTI-3). However since the UL grant timing, i.e. timing between UL grant and corresponding uplink transmission, needs to be also considered, reporting power headroom for the first overlapped TTI may ensure sufficient processing time to calculate the PH information.

Figure 8:
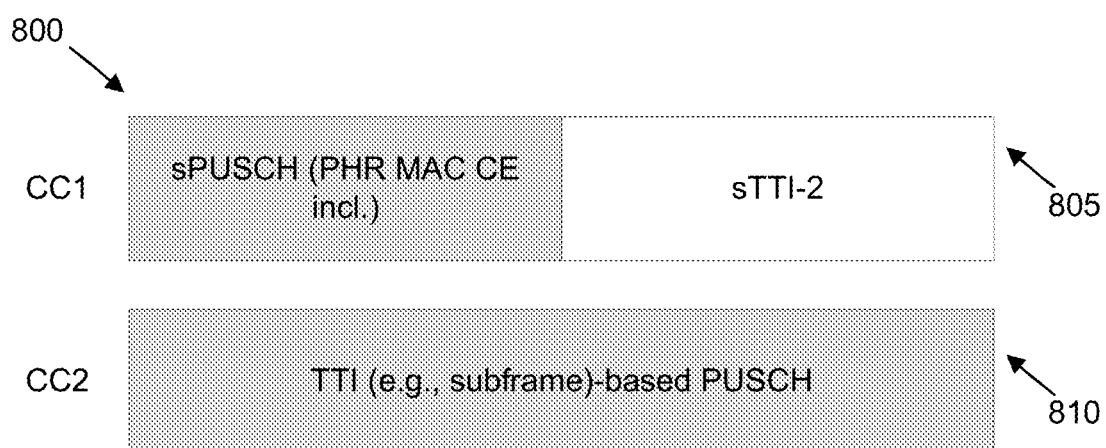
FIG. 8 is a block diagram illustrating a fourth embodiment of a scenario where a UE aggregates carriers configured with different TDU lengths.

FIG. 8 depicts a fourth scenario 800 where the UE 205 aggregates serving cells (e.g., in a carrier aggregation deployment) with different TTI lengths, according to various embodiments of the disclosure. In various embodiments, when PHR is due on more than one CC, the UE 205 may report the PH information for the earliest PHR occasion, and the pending PHR corresponding to the longer TTI may be cancelled if a virtual PHR is reported for the CC associated with the longer TTI assuming a shorter TTI length. Here, the UE aggregates a first component carrier (e.g., "CC1") 805 and second component carrier (e.g., "CC2") 810. Note that in the fourth scenario 800, the UE is scheduled for sPUSCH on sTTI-1 of CC1 805. During the depicted time duration, CC2 810 includes a TTI (e.g., subframe)-based PUSCH.

In the fourth scenario 800, assume sPUSCH at sTTI-1 of CC1 805 is scheduled with n+4 timing, i.e., 4 slots before sTTI-1, and subframe-based PUSCH is scheduled with n+3 timing, i.e., 3 subframes before the subframe where PUSCH is transmitted). Here, the UE 205 may report a (e.g., virtual) PHR computed assuming the PHR calculation for the UL sTTI in which the PHR is transmitted (according to 3GPP agreement), and may further cancel the PHR that was due on subframe-length TTI on CC2 810.

FIG. 9 depicts a fifth scenario 900 where the UE 205 aggregates serving cells (e.g., in a carrier aggregation deployment) with different TTI lengths, according to various embodiments of the disclosure. Apart from the shorter TTI durations introduced for LTE Rel-15 or NR, also the minimum timing from UL grant transmission to UL PUSCH transmission has been reduced. Therefore, the different timing relations, i.e., (s)PDCCH to sPUSCH, also need to be considered when reporting power headroom information.

In the fifth scenario 900, the UE 205 aggregates a first component carrier (e.g., "CC1") 905 and second component carrier (e.g., "CC2") 910. Note that in the fifth scenario 900, the UE is scheduled for sPUSCH on sTTI-4 of CC1 905 and on sTTI-14 of CC2 910. As depicted, the UE 205 is aggregating two serving cells/CCs with different TTI lengths, where one TTI of CC1 overlaps with three TTIs of CC2 910. Also, the timing relations between UL grant and the corresponding UL PUSCH transmission may be different for the two aggregated serving cells.

As power headroom is calculated based on a received UL grant, i.e. estimated UL power according to the grant, when configured with different serving cells having different TTI lengths (and potentially also different timing relations, i.e. from UL grant to corresponding UL transmission), when generating the PHR MAC CE the UE 205 may not be aware (e.g., at sTTI-0 of CC1 905) whether there will be some uplink transmission on the other carriers in any of the TTIs which overlap with the TTI in which PHR MAC CE is transmitted. For example, the UE might not be fast enough to process the UL grant(s) for the overlapping TTIs on the other carriers when calculating the power headroom information. Taking the exemplary scenario depicted in FIG. 9, when generating the PHR MAC CE for transmission on CC1 905 in sTTI-4, the UE is not aware of the presence of an UL grant for the overlapping sTTI(s) on CC2 910, i.e. sTTI-13, sTTI-14 and sTTI-15.

Therefore, the UE 205 may determine whether the power headroom value for an activated Serving Cell is based on real transmission or a reference format by considering the downlink control information which has been received until and including the PDCCH occasion in which the first UL grant is received since a PHR has been triggered. Here, the UE 205 considers all the UL grants having received until it receives an UL grant allocating UL resource for inclusion of PHR MAC CE. In the example above, the UE 205 considers all UL allocations having been received until and including sTTI-0 on CC1 for determining the PHR format. Therefore, the UE 205 reports a virtual PHR for CC2 since no UL grant information is available for the overlapping sTTIs on CC2, i.e., sTTI-13, sTTI-14 and sTTI-15. Because the UE 205 doesn't have UL grant information for any of the overlapping sTTIs on CC2, the UE 205 would report always a virtual PHR for CC2 regardless of how the reference PHR TTI is defined, i.e. TTI to which a reported PHR refers to.

However, considering that the UE 205 might be also configured with UL resources without dynamic scheduling, i.e., Semi-Persistent scheduling (SPS) or configured grants, it is still required to define a reference PHR TTI.

Assuming that the UE 205 is allocated configured grants for one or multiple of the overlapping sTTIs on CC2, the UE 205 needs to know for which of the overlapping TTI to report power headroom information. It should be noted that the UE 205 may be aware of these configured grants at sTTI-0 on CC1 and hence should consider them for PHR reporting. Here, the reference PHR TTI could be e.g. defined—as outlined in the other embodiment—as the first of the overlapping (s)TTIs which are scheduled for an uplink transmission. Alternatively, the reference PHR TTI, i.e. TTI for which Power headroom level is computed, could be defined as the first overlapped (s)TTI.

According to another embodiment, the UE 205 reports a virtual PHR for a carrier/serving cell which has a different TTI length than the serving cell on which PHR MAC CE is transmitted. Taken the examples depicted in the above figures, the PHR MAC CE is transmitted on CC1 which has a TTI length of e.g. seven OFDM symbols (OS). As CC2 is configured 2OS-UL TTI respectively 3OS-UL TTI, the UE will report virtual for CC2, i.e. PHR calculation is performed for 7OS-UL TTI and there is no 7OS-UL allocation/transmission on CC2.

Referring back to FIG. 7, in some embodiments, the UE 205 reports a virtual power headroom corresponding to a first TTI length (e.g., slot-length TTI) on CC2 within the PHR MAC CE transmitted in sTTI-1 on CC1, although CC2 is not configured with the first TTI length (e.g., slot-length TTI), but configured with a second TTI length (e.g., ⅔ OFDM/SC-FDMA symbol duration).

To calculate the virtual PHR, the UE 205 assumes a TPC state (e.g., "f" used in the power control formula) corresponding to a third TTI length. In one example, the TPC state may be derived from one or both of the TPC states corresponding to 1 ms and ⅔ symbol sTTI. For example, the third TTI can be: a) fixed/specified to 1 ms TTI, b) fixed/specified to ⅔ symbol-sTTI, c) indicated/configured to one of 1 ms TTI or ⅔ symbol-sTTI, or d) most recently scheduled TTI length on CC2.

In another embodiment, the UE 205 reports a power headroom for CC2 corresponding to a TTI length (e.g., 1 ms-length TTI) different than the TTI length configured for CC2 within the PHR MAC CE transmitted in sTTI-1 on CC1. For example, referring again to FIG. 3, the UE 205 may report a virtual power headroom for CC2 within the PHR MAC CE transmitted in sTTI-1 on CC1, wherein the TTI length that the virtual power headroom for CC2 is based on is different than the TTI length associated with the sPUSCH transmission on CC2. One example of computing a power headroom for a component carrier/serving cell based on a TTI length being different than the TTI length configured for this component carrier/serving cell is described above with reference to FIG. 3.

According to one embodiment, the UE 205 aggregating multiple serving cells reports an actual PHR for a serving cell/CC according to a configured grant, i.e. UL resources allocated without dynamic scheduling, even though there is no PUSCH transmission in the corresponding TTI on that serving cell. Here, the UE 205 transmits the PHR MAC CE on one of the other activated serving cells on which a PUSCH transmission takes place.

For cases when UE 205 has no data available for transmission in its buffer, UE 205 may not perform an uplink transmission on PUSCH even though it has a valid resource allocation, e.g., allocated by a configured grant like SPS scheduling. Because there is no higher layer data available, the UE 205 would otherwise send a MAC PDU which contains only padding bits and potentially padding BSR. However, from a power headroom reporting perspective, it will be still useful to send an actual PHR for the serving cell, i.e. Power headroom calculation is based on the uplink resource allocation, even when there is no PUSCH transmission, since the actual PHR provides more information to the RAN node than a virtual PHR.

The actual PHR provides for example information on the used MPR for the corresponding uplink allocation, which is not provided by a virtual PHR, i.e. MPR is set to 0 dB for a virtual PHR. Furthermore, the UE 205 might know at a late point of time whether it will skip the uplink transmission or not due to changes in its transmission buffer.

FIG. 10 depicts a sixth scenario 1000 where the UE 205 aggregates serving cells (e.g., in a carrier aggregation deployment) with different TTI lengths, according to various embodiments of the disclosure. Here, the UE 205 aggregates a first component carrier (e.g., "CC1") 1005 and second component carrier (e.g., "CC2") 1010. Note that in the sixth scenario 1000, the UE 205 is scheduled for sPUSCH on sTTI-4 of CC1 and sTTI-13 and sTTI-14 of CC2.

In the sixth scenario 1000, the UE 205 at sTTI-0 on CC1 when receiving an UL grant allocating PUSCH resources in sTTI-4 which contains a PHR MAC CE, i.e. there was a triggered PHR pending before sTTI-0, is not aware of the presence of a UL grant received for the overlapping sTTI-13. However, the UE 205 at sTTI-0 on CC1 is aware of the configured grant for sTTI-14 on CC2. Therefore, the UE 205 may report an actual PHR for CC2 for sTTI-14 within the PHR MAC CE contained in the PUSCH in sTTI-4 on CC1.

Because at the point of time when UE is generating the PHR MAC CE it is only aware of the configured grant in sTTI-14, the UE reports an actual PHR for this sTTI on CC2 even though the UE 205 might later on skip the corresponding PUSCH transmission on CC2 (in sTTI-14) due to an empty buffer. It should be noted that the PHR format is different for an actual reported PHR and a virtual PHR due to the fact that the UE reports $P_{CMAX,C}$ for an actual PHR in addition to the PH info. Therefore, in various embodiments the UE 205 follows the determined PHR format even if, later on, the UE 205 is actually not performing a PUSCH transmission on a serving cell for which an actual PHR is reported.

According to another embodiment, the UE 205 aggregating several serving cells reports an actual PHR for a serving cell according to a dynamic UL grant, i.e. UL resource allocated by downlink control information (DCI), even though the UE skips the corresponding PUSCH transmission on this serving cell since there is no data available for transmission in the buffer. Similar as for the previous embodiment, reporting an actual PHR is beneficial for the scheduler since the actual PHR, i.e. power headroom information calculation computed according to the received UL grant, provides information on the MPR used for the corresponding UL allocation.

Referring again to FIG. 9, the UE 205 may transmit a PHR MAC CE in sTTI-4 on CC1 including a virtual PH for CC2 because the UE is not aware of any uplink allocations in the "overlapping" sTTIs on CC2 when generating the PHR MAC CE. In the case where the UE 205 receives later in sTT8 on CC2 an UL grant for sTTI-14, the UE 205 may include a PHR MAC CE in the corresponding PUSCH transmission in sTTI-14 which includes an actual PHR for CC2 (actual PHR computed based on UL grant for sTTI-14). This second PHR MAC CE provides more detailed information to the scheduler in the RAN node, e.g., because it also provides information on the used MPR for CC2.

For cases where a "longer" sTTI overlaps with several "shorter" sTTIs and several of these overlapping (s)TTIs are scheduled for an uplink transmission, a rule (e.g., network policy) allows for unambiguous determination of which of the overlapping (s)TTIs UE reports power headroom information.

The PHR is used to give the scheduler (in RAN node) an indication whether additional resources can be scheduled without power scaling at the UE 205, or whether resources should be reduced to avoid the power scaling. Therefore, according to another embodiment, the UE 205 reports the smallest PHR across the scheduled "overlapping" sTTIs. Referring again to FIG. 7, the UE 205 may report for CC2, the smallest actual PHR of the multiple (scheduled) overlapping sTTIs (e.g., that of sTTI-3 on CC2).

According to another embodiment, the PHR MAC CE includes a field to indicate which TDU was used for the PHR computation for CC2. Then the scheduler in the RAN node unambiguously knows which UL grant is the reference for the PH computation. Including the information explicitly in the PHR MAC CE would be also a safeguard against the loss of an UL grant, i.e. a situation where the base station scheduled sTTI-1 through sTTI-3 on CC2, but the UE 205 only detects the scheduling for sTTI-2 and sTTI-3. In that case, if there is no explicit TDU indicator included in the PHR MAC CE, but only the rule exists that the PHR is based on the first overlapping scheduled sTTI, the UE 205 would report for sTTI-2 on CC2, but the RAN nodes would (incorrectly) interpret it as a PHR valid for sTTI-1 on CC2.

Furthermore, for the case where the UE 205 is free to choose which TDU is the reference for the reported sTTI (i.e. the UE 205 would be free to not report the minimum PHRs for that carrier), the indication of the reference TDU is used by the scheduler to correctly interpret the reported PH information and to use this information for future uplink resource allocations.

In one embodiment, on a first CC in which the PHR MAC CE is not transmitted, if PUSCH is scheduled on this carrier (CC1) in the subframe in which the PHR is transmitted on the second CC (CC2), and an sPUSCH also is scheduled on the first CC or sPUCCH is transmitted on the first CC, then the PUSCH transmission is stopped or dropped in the subframe on the first CC and sPUSCH/sPUCCH is transmitted on the first CC. Here, the PHR for this carrier (first CC) is an actual PHR for the scheduled PUSCH.

Figure 11:
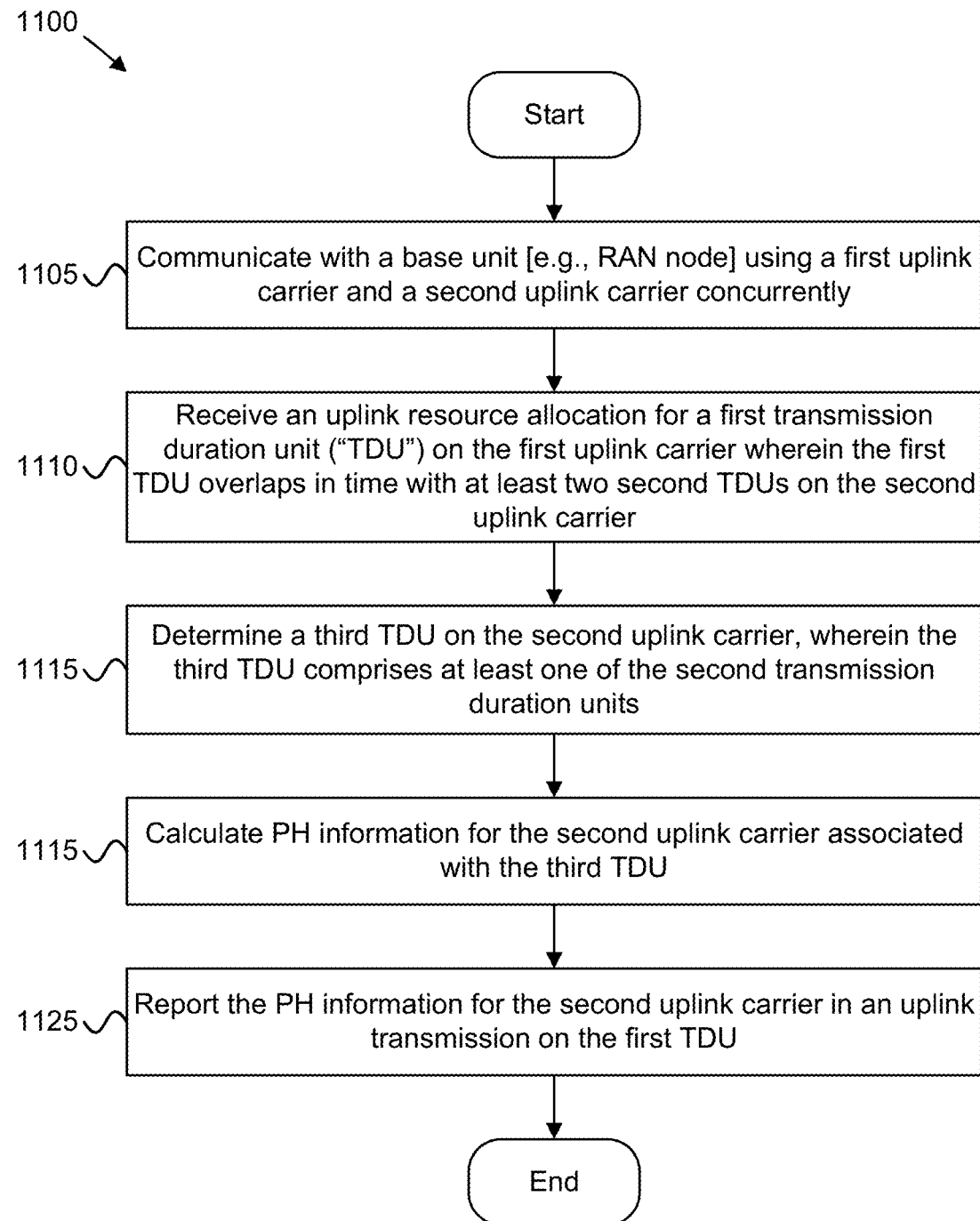
FIG. 11 is a flow chart diagram illustrating one method of reporting power headroom information.

FIG. 11 is a schematic flow chart diagram illustrating one embodiment of a method 1100 for receiving a paging message, according to embodiments of the disclosure. In some embodiments, the method 1100 is performed by a remote unit, such as the remote unit 105, the UE 205, and/or the user equipment apparatus 400. In certain embodiments, the method 1100 may be performed by a processor executing program code, for example, a microcontroller, a microprocessor, a CPU, a GPU, an auxiliary processing unit, a FPGA, or the like.

The method 1100 begins and the remote unit communicates 1105 with a base unit using a first uplink carrier and a second uplink carrier concurrently. Here, each carrier has a different transmission duration unit length, wherein the first uplink carrier has a longer transmission duration unit length than the second uplink carrier. In some embodiments, each of the first and second uplink carriers is associated with a different serving cell.

The method 1100 includes receiving 1110 an uplink resource allocation for a first transmission duration unit on the first uplink carrier. Here, the first transmission duration unit overlaps in time with at least two second transmission duration units on the second uplink carrier.

In certain embodiments, the remote unit also receives an uplink resource allocation for at least one of the overlapping second transmission duration units on the second uplink carrier.

The method 1100 includes determining 1115 a third transmission duration unit on the second uplink carrier. Here, the third transmission duration unit comprises at least one of the second transmission duration units.

The method 1100 includes calculating 1120 PH information for the second uplink carrier associated with the third transmission duration unit and reporting 1125 the PH information in an uplink transmission on the first transmission duration unit. The method 1100 ends. In some embodiments, the PH information is calculated according to a predefined reference format. In certain embodiments, the PH information is calculated assuming the apparatus is not scheduled to transmit a PUSCH in the third transmission duration unit.

In some embodiments, the first transmission duration unit corresponds to a slot on the first uplink carrier and the second transmission duration unit corresponds to a slot on the second uplink carrier. In certain embodiments, multiple second slots on the second uplink carrier fully overlap with the first slot. In such embodiments, calculating 1120 PH information may include calculating PH information for a first physical uplink shared channel ("PUSCH") scheduled on the first of the multiple second slots that fully overlaps with the first slot on the first uplink carrier, wherein reporting 1125 the PH information for the second uplink carrier in an uplink transmission on the first slot comprises transmitting on a PUSCH a power headroom report ("PHR") that contains the PH information for the first PUSCH. In certain embodiments, the first uplink carrier is configured with a first subcarrier spacing ("SCS") and the second uplink carrier is configured with a second SCS, wherein the first SCS is smaller than the second SCS.

In some embodiments, the first transmission duration unit corresponds to a transmit time interval ("TTI") of the first uplink carrier and the second transmission duration unit corresponds to a TTI of the second uplink carrier. In certain embodiments, the first uplink carrier is configured with a first TTI length and the second uplink carrier is configured with a second TTI length, wherein the first TTI length is larger than the second TTI length. In such embodiments, calculating 1120 PH information for the second uplink carrier associated with the third transmission duration unit comprises calculating PH for a TTI duration longer than the second TTI length.

In certain embodiments, the length of the third transmission duration unit is greater than the length of the first TTI. In certain embodiments, the third transmission duration unit is equal to a subframe. In certain embodiments, calculating 1120 PH information for the second uplink carrier associated with the third transmission duration unit comprises calculating PH information for a subframe containing the first TTI. In certain embodiments, the third transmission duration unit contains multiple TTIs of the second uplink carrier.

In various embodiments, the reporting 1125 PH information comprises reporting a power headroom level computed based on the uplink resource allocation. In some embodiments, the at least one of the second transmission duration units on the second uplink carrier (e.g., second TTI on the second uplink carrier) has a shortened TTI length that is less than 1 millisecond. In some embodiments, the PH information is calculated based on an uplink resource allocation received for the third transmission duration unit. In such embodiments, the uplink transmission on the third transmission duration may be either stopped or dropped.

Disclosed herein is a first apparatus for reporting power headroom ("PH") information. In various embodiments, the first apparatus may be the remote unit 105, the UE 205, and/or the user equipment apparatus 400. The first apparatus includes a transceiver that communicates with a base unit using a first uplink carrier and a second uplink carrier concurrently. Here, each carrier has a different transmission duration unit length, wherein the first uplink carrier has a longer transmission duration unit length than the second uplink carrier. The first apparatus also includes a processor that receives an uplink resource allocation for a first transmission duration unit on the first uplink carrier. Here, the first transmission duration unit overlaps in time with at least two second transmission duration units on the second uplink carrier. The processor also determines a third transmission duration unit on the second uplink carrier. Here, the third transmission duration unit comprises at least one of the second transmission duration units. The processor calculates PH information for the second uplink carrier associated with the third transmission duration unit and reports, via the transceiver, the PH information in an uplink transmission on the first transmission duration unit.

In some embodiments, each of the first and second uplink carriers is associated with a different serving cell. In some embodiments, the processor further receives an uplink resource allocation for at least one of the overlapping second transmission duration units on the second uplink carrier.

In some embodiments, the first transmission duration unit corresponds to a slot on the first uplink carrier and the second transmission duration unit corresponds to a slot on the second uplink carrier. In certain embodiments, multiple second slots on the second uplink carrier fully overlap with the first slot. In such embodiments, the processor calculates PH information for a first physical uplink shared channel ("PUSCH") scheduled on the first of the multiple second slots that fully overlaps with the first slot on the first uplink carrier, wherein reporting PH information for the second uplink carrier in an uplink transmission on the first slot comprises transmitting on a PUSCH a power headroom report ("PHR") that contains the PH information for the first PUSCH. In certain embodiments, the first uplink carrier is configured with a first subcarrier spacing ("SCS") and the second uplink carrier is configured with a second SCS, wherein the first SCS is smaller than the second SCS.

In some embodiments, the first transmission duration unit corresponds to a transmit time interval ("TTI") of the first uplink carrier and the second transmission duration unit corresponds to a TTI of the second uplink carrier. In certain embodiments, the first uplink carrier is configured with a first TTI length and the second uplink carrier is configured with a second TTI length, wherein the first TTI length is larger than the second TTI length. In such embodiments, calculating PH information for the second uplink carrier associated with the third transmission duration unit comprises calculating PH for a TTI duration longer than the second TTI length.

In certain embodiments, the length of the third transmission duration unit is greater than the length of the first TTI. In certain embodiments, the third transmission duration unit is equal to a subframe. In certain embodiments, calculating PH information for the second uplink carrier associated with the third transmission duration unit comprises calculating PH information for a subframe containing the first TTI. In certain embodiments, the third transmission duration unit contains multiple TTIs of the second uplink carrier.

In some embodiments, the processor calculates the PH information according to a predefined reference format. In certain embodiments, the processor calculates the PH information assuming the apparatus is not scheduled to transmit a PUSCH in the third transmission duration unit.

In various embodiments, the reported PH information comprises a power headroom level computed based on the uplink resource allocation. In some embodiments, the at least one of the second transmission duration units on the second uplink carrier has a shortened TTI length that is less than 1 millisecond. In some embodiments, the PH information is calculated based on an uplink resource allocation received for the third transmission duration unit. In such embodiments, the uplink transmission on the third transmission duration may be either stopped or dropped.

Disclosed herein is a first method for reporting power headroom ("PH") information. In various embodiments, the first method is performed by a UE, such as the remote unit 105, the UE 205, and/or the user equipment apparatus 400. The first method includes the UE communicating with a base unit using a first uplink carrier and a second uplink carrier concurrently. Here, each carrier has a different transmission duration unit length, wherein the first uplink carrier has a longer transmission duration unit length than the second uplink carrier. The first method includes receiving an uplink resource allocation for a first transmission duration unit on the first uplink carrier. Here, the first transmission duration unit overlaps in time with at least two second transmission duration units on the second uplink carrier. The first method includes determining a third transmission duration unit on the second uplink carrier. Here, the third transmission duration unit comprises at least one of the second transmission duration units. The first method includes calculating PH information for the second uplink carrier associated with the third transmission duration unit and reporting the PH information in an uplink transmission on the first transmission duration unit.

In some embodiments, each of the first and second uplink carriers is associated with a different serving cell. In some embodiments, the first method further includes receiving an uplink resource allocation for at least one of the overlapping second transmission duration units on the second uplink carrier.

In some embodiments, the first transmission duration unit corresponds to a slot on the first uplink carrier and the second transmission duration unit corresponds to a slot on the second uplink carrier. In certain embodiments, multiple second slots on the second uplink carrier fully overlap with the first slot. In such embodiments, the method further includes calculating PH information for a first physical uplink shared channel ("PUSCH") scheduled on the first of the multiple second slots that fully overlaps with the first slot on the first uplink carrier, wherein reporting PH information for the second uplink carrier in an uplink transmission on the first slot comprises transmitting on a PUSCH a power headroom report ("PHR") that contains the PH information for the first PUSCH. In certain embodiments, the first uplink carrier is configured with a first subcarrier spacing ("SCS") and the second uplink carrier is configured with a second SCS, wherein the first SCS is smaller than the second SCS.

In some embodiments, the first transmission duration unit corresponds to a transmit time interval ("TTI") of the first uplink carrier and the second transmission duration unit corresponds to a TTI of the second uplink carrier. In certain embodiments, the first uplink carrier is configured with a first TTI length and the second uplink carrier is configured with a second TTI length, wherein the first TTI length is larger than the second TTI length. In such embodiments, calculating PH information for the second uplink carrier associated with the third transmission duration unit comprises calculating PH for a TTI duration longer than the second TTI length.

In certain embodiments, the length of the third transmission duration unit is greater than the length of the first TTI. In certain embodiments, the third transmission duration unit is equal to a subframe. In certain embodiments, calculating PH information for the second uplink carrier associated with the third transmission duration unit comprises calculating PH information for a subframe containing the first TTI. In certain embodiments, the third transmission duration unit contains multiple TTIs of the second uplink carrier.

In some embodiments, the PH information is calculated according to a predefined reference format. In certain embodiments, the PH information is calculated assuming the apparatus is not scheduled to transmit a PUSCH in the third transmission duration unit.

In various embodiments, the reported PH information comprises a power headroom level computed based on the uplink resource allocation. In some embodiments, the at least one of the second transmission duration units on the second uplink carrier has a shortened TTI length that is less than 1 millisecond. In some embodiments, the PH information is calculated based on an uplink resource allocation received for the third transmission duration unit. In such embodiments, the uplink transmission on the third transmission duration may be either stopped or dropped.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of a UE comprising:
communicating with a base unit using a first uplink carrier and a second uplink carrier concurrently, the first uplink carrier being configured with a first subcarrier spacing ("SCS") and the second uplink carrier being configured with a second SCS, wherein the first SCS is smaller than the second SCS;
receiving an uplink resource allocation for a first slot on the first uplink carrier wherein the first slot fully overlaps in time with at least two second slots on the second uplink carrier;
receiving an uplink resource allocation for at least one of the at least two second slots on the second uplink carrier that are fully overlapped by the first slot on the first uplink carrier;
calculating power headroom ("PH") information for the second uplink carrier for a first physical uplink shared channel ("PUSCH") scheduled on a first of the at least two second slots that are fully overlapped by the first slot on the first uplink carrier; and
reporting the PH information in an uplink transmission on the first slot on the first uplink carrier.

2. The method of claim 1, wherein each of the first and second uplink carriers is associated with a different serving cell.

3. The method of claim 1, further comprising receiving a second uplink resource allocation for at least one of the overlapping second slots on the second uplink carrier.

4. The method of claim 1, the method further comprising:
wherein reporting PH information for the second uplink carrier in an uplink transmission on the first slot comprises transmitting on a PUSCH a power headroom report ("PHR") that contains the PH information for the first PUSCH scheduled on the first of the at least two second slots that are fully overlapped by the first slot.

5. The method of claim 1, wherein the first slot corresponds to a transmit time interval ("TTI") of the first uplink carrier and the second slots correspond to TTIs of the second uplink carrier.

6. The method of claim 5, wherein the first uplink carrier is configured with a first TTI length and the second uplink carrier is configured with a second TTI length, wherein the first TTI length is larger than the second TTI length.

7. The method of claim 6, wherein calculating PH information for the second uplink carrier comprises calculating PH for a TTI duration longer than the second TTI length.

8. The method of claim 7, wherein the PH for the second uplink carrier is calculated for TTI duration that is greater than the length of the first TTI.

9. The method of claim 7, wherein the PH for the second uplink carrier is calculated for TTI duration that is equal to a subframe.

10. The method of claim 7, wherein calculating PH information for the second uplink carrier comprises calculating PH information for a subframe containing the first TTI.

11. The method of claim 7, wherein the PH for the second uplink carrier is calculated for TTI duration that contains multiple TTIs of the second uplink carrier.

12. The method of claim 6, wherein the PH information is calculated according to a predefined reference format.

13. The method of claim 12, wherein the PH information is calculated assuming the UE is not scheduled to transmit a PUSCH in the at least two second slots that fully overlaps with the first slot.

14. The method of claim 6, wherein the at least one of the second slots on the second uplink carrier has a shortened TTI length that is less than 1 millisecond.

15. The method of claim 1, wherein the reported PH information comprises a power headroom level computed based on the uplink resource allocation.

16. The method of claim 1, wherein the PH information is calculated based on an uplink resource allocation received for the third transmission duration unit.

17. The method of claim 16, wherein an uplink transmission on the third transmission duration is one of: stopped and dropped.

18. An apparatus comprising:
a transceiver that communicates with a base unit using a first uplink carrier and a second uplink carrier concurrently, the first uplink carrier being configured with a first subcarrier spacing ("SCS") and the second uplink carrier being configured with a second SCS, wherein the first SCS is smaller than the second SCS; and
a processor that:
receives an uplink resource allocation for a first slot on the first uplink carrier, wherein the first slot overlaps in time with at least two second slots on the second uplink carrier;
receives an uplink resource allocation for at least one of the at least two second slots on the second uplink carrier that are fully overlapped by the first slot on the first uplink carrier;
calculates power headroom ("PH") information for the second uplink carrier for a first physical uplink shared channel ("PUSCH") scheduled on a first of the at least two second slots that are fully overlapped by the first slot on the first uplink carrier; and
reports, via the transceiver, the PH information in an uplink transmission on the first slot on the first uplink carrier.

19. The apparatus of claim 18,
wherein reporting PH information for the second uplink carrier in an uplink transmission on the first slot comprises transmitting on a PUSCH a power headroom report ("PHR") that contains the PH information for the first PUSCH scheduled on the first of the at least two second slots that are fully overlapped by the first slot.

20. The apparatus of claim 18, wherein the first slot corresponds to a first transmit time interval ("TTI") of the first uplink carrier and the second slots corresponds to TTIs of the second uplink carrier.

21. The apparatus of claim 20, wherein the first uplink carrier is configured with a first TTI length and the second uplink carrier is configured with a second TTI length, wherein the first TTI length is larger than the second TTI length.

22. The apparatus of claim 21, wherein calculating PH information for the second uplink carrier comprises calculating PH for a TTI duration longer than the second TTI length.

23. The apparatus of claim 22, wherein the PH for the second uplink carrier is calculated for TTI duration that is equal to a subframe.

24. The apparatus of claim 21, wherein the PH information is calculated according to a predefined reference format.

25. The apparatus of claim 18, wherein each of the first and second uplink carriers is associated with a different serving cell.

26. The apparatus of claim 18, wherein the processor receives a second uplink resource allocation for at least one of the overlapping second slots on the second uplink carrier.

* * * * *